United States Patent
Morimoto

(10) Patent No.: US 9,150,128 B2
(45) Date of Patent: Oct. 6, 2015

(54) VEHICLE SEAT CUSHION FRAME

(71) Applicant: TOYOTA BOSHOKU KABUSHIKI KAISHA, Aichi-ken (JP)

(72) Inventor: Takeshi Morimoto, Tajimi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 59 days.

(21) Appl. No.: 13/751,415

(22) Filed: Jan. 28, 2013

(65) Prior Publication Data

US 2013/0193725 A1 Aug. 1, 2013

(30) Foreign Application Priority Data

Feb. 1, 2012 (JP) .................................. 2012-019687

(51) Int. Cl.
   *B60N 2/68* (2006.01)
   *B60N 2/42* (2006.01)
   *B60N 2/427* (2006.01)
   *B60N 2/16* (2006.01)

(52) U.S. Cl.
   CPC ............ *B60N 2/4221* (2013.01); *B60N 2/1615* (2013.01); *B60N 2/42718* (2013.01); *B60N 2/68* (2013.01)

(58) Field of Classification Search
   CPC ................................ B60N 2/4221; B60N 2/68
   USPC .......................................... 297/452.18, 216.1
   See application file for complete search history.

(56) References Cited

U.S. PATENT DOCUMENTS

| | | | |
|---|---|---|---|
| 4,783,897 A * | 11/1988 | Basnett ............................ | 92/161 |
| 5,284,381 A * | 2/1994 | Aoki et al. ................ | 297/452.18 |
| 5,988,756 A * | 11/1999 | Aufrere et al. ............ | 297/452.18 |
| 6,505,889 B2 * | 1/2003 | Frolo et al. ................ | 297/354.12 |
| 6,505,890 B2 * | 1/2003 | Riley et al. ................. | 297/452.2 |
| 8,408,654 B2 * | 4/2013 | Jones et al. ............... | 297/452.18 |
| 2003/0020306 A1 * | 1/2003 | Eckendorff ................ | 297/216.1 |

(Continued)

FOREIGN PATENT DOCUMENTS

| CN | 102131671 | 7/2011 |
|---|---|---|
| JP | 2001-145538 | 5/2001 |

(Continued)

OTHER PUBLICATIONS

U.S. Appl. No. 13/751,562 to Takeshi Morimoto, which was filed on Jan. 28, 2013.

(Continued)

*Primary Examiner* — David R Dunn
*Assistant Examiner* — Timothy J Brindley
(74) *Attorney, Agent, or Firm* — Greenblum & Bernstein, P.L.C.

(57) ABSTRACT

A vehicle seat cushion frame includes longitudinal frame members, lateral frame members and a panel. A framework of a seat cushion is formed by connecting front and rear sides of the longitudinal frame members, arranged at both right and left sides, with the lateral frame members. The panel is fixed to the both longitudinal frame members so as to cover a space between front end portions of the both longitudinal frame members, including the front-side lateral frame member, from above. The front-side lateral frame member has connecting portions, at which the front-side lateral frame member is connected to the longitudinal frame members. A portion of the front-side lateral frame member, which is between the connecting portions, is thinner than the connecting portions.

4 Claims, 4 Drawing Sheets

(56) References Cited

U.S. PATENT DOCUMENTS

| | | | |
|---|---|---|---|
| 2005/0035641 A1* | 2/2005 | Petersen | 297/396 |
| 2005/0039250 A1* | 2/2005 | Krause | 4/483 |
| 2009/0230752 A1* | 9/2009 | Adragna et al. | 297/463.1 |
| 2010/0219674 A1* | 9/2010 | Sakkinen et al. | 297/452.18 |
| 2011/0133538 A1* | 6/2011 | Adragna et al. | 297/452.18 |
| 2011/0140497 A1* | 6/2011 | Fookes et al. | 297/411.2 |
| 2012/0261963 A1* | 10/2012 | Heyer | 297/313 |
| 2013/0093226 A1* | 4/2013 | Mitsuhashi et al. | 297/232 |
| 2013/0119721 A1* | 5/2013 | Suzuki et al. | 297/216.1 |
| 2013/0193737 A1* | 8/2013 | Morimoto | 297/452.18 |
| 2013/0292989 A1* | 11/2013 | Le et al. | 297/452.2 |
| 2013/0341484 A1* | 12/2013 | Yamada et al. | 248/636 |

FOREIGN PATENT DOCUMENTS

| | | |
|---|---|---|
| JP | 2003-096737 | 4/2003 |
| JP | 2011-073548 | 4/2011 |

OTHER PUBLICATIONS

Chinese Official Action for CN20130042537.X dated Feb. 4, 2015, along with an English-language translation thereof.

Japanese Office Action for JP App. No. 2012-019687 issued May 19, 2015, along with English-language translation thereof.

* cited by examiner

VEHICLE SEAT CUSHION FRAME

INCORPORATION BY REFERENCE

The disclosure of Japanese Patent Application No. 2012-019687 filed on Feb. 1, 2012 including the specification, drawings and abstract is incorporated herein by reference in its entirety.

BACKGROUND OF THE INVENTION

1. Field of the Invention

The invention relates to a vehicle seat cushion frame that is formed such that a framework of a seat cushion is formed by connecting front and rear sides of longitudinal frame members arranged at both right and left sides with lateral frame members, respectively, and a panel is fixed to both longitudinal frame members so as to cover a space between front end portions of both longitudinal frame members, including the front-side lateral frame member, from above.

2. Description of Related Art

In the event of a frontal collision of a vehicle, there may occur a so-called submarine phenomenon, that is, a phenomenon that the body of an occupant seated on a seat slips off forward and downward from a seat surface in a state where the occupant is restrained by a seatbelt. At this time, in terms of occupant protection, it is required for an excessive impact load not to act on the occupant. Therefore, in an existing art, various ideas are added to components around the seat. Japanese Patent Application Publication No. 2001-145538 (JP 2001-145538 A) describes an invention that allows part of a seat back frame to be easily deformed so that an excessive load does not act on the lumbar of an occupant in the event of a frontal collision of a vehicle. Furthermore, in some vehicles, energy generated as a result of movement of an occupant forward and downward of a seat is absorbed by deforming the front portion of a seat cushion against a load that is input from the front upper side of the seat cushion as a result of occurrence of a submarine phenomenon in the event of a frontal collision of the vehicle.

In seats of some vehicles, the amount of deformation that is required to absorb energy that is generated as a result of a submarine phenomenon cannot be ensured at a seat front portion. This is due to the following reason. A front-side lateral frame member that constitutes a framework of the seat is arranged below a panel that constitutes the seat front portion. Even when the panel deforms due to an impact load, deformation of the panel is impaired by the front-side lateral frame member. Therefore, the amount of absorption of energy through deformation of the panel becomes insufficient.

SUMMARY OF THE INVENTION

It is an object of the invention to absorb an impact load, which is generated as a result of a submarine phenomenon, with a seat front portion by making it easy for a front-side lateral frame member to deform through a decreased strength of the front-side lateral frame member.

An aspect of the invention provides a vehicle seat cushion frame. The vehicle seat cushion frame includes: longitudinal frame members that are arranged at both right and left sides of a framework of a seat cushion; lateral frame members that connect front and rear sides of the longitudinal frame members; and a panel that is fixed to the both longitudinal frame members so as to cover a space between front end portions of the both longitudinal frame members, including the front-side lateral frame member, from above. The front-side lateral frame member has connecting portions, at which the front-side lateral frame member is connected to the longitudinal frame members. A portion of the front-side lateral frame member, which is between the connecting portions, is thinner than the connecting portions. With the above configuration, the thickness of the front-side lateral frame member is thin, so the strength of the front-side lateral frame member against pressing via the panel is small. Therefore, when the panel is deformed as a result of a submarine phenomenon in the event of a collision of a vehicle, the front-side lateral frame member is also deformed, and it is possible to effectively absorb energy that is generated through the collision. In addition, the thickness of each of the connecting portions, at which the front-side lateral frame member is connected to the longitudinal frame members, is not thin, so it is possible not to decrease the strength of connection between the longitudinal frame members and the lateral frame member. For example, when the lateral frame member is connected to the longitudinal frame members by welding, the large heat capacity of each of the welded portions is ensured together with the large thickness of the lateral frame member, so excessive melting of the welded portions is prevented through adequate dispersion of welding heat, and it is possible to prevent a decrease in welding strength.

In the above aspect, the lateral frame member may be increased in thickness by overlapping additional members with the connecting portions, at which the lateral frame member is connected to the longitudinal frame members. With the above configuration, in order to change the thickness between the portion between the connecting portions, at which the single lateral frame member is connected to the longitudinal frame members, and the connecting portions, it is just required to add the additional members, so it is possible to increase productivity for changing the thickness.

In the above aspect, the lateral frame member may be a cylindrical member. In addition, both opening sides of the cylindrical member may be respectively connected to the longitudinal frame members so as to extend through the longitudinal frame members, and reinforcement cylindrical members may be fitted to an inner peripheral side or outer peripheral side of the cylindrical member at the respective connecting portions, at which the cylindrical member is connected to the longitudinal frame members. Furthermore, the cylindrical member and the reinforcement cylindrical members may be integrated with each other by swaging in mutually overlapped directions. With the above configuration, it is possible to change the thickness by overlapping the reinforcement cylindrical members with the cylindrical member that forms the lateral frame member and then integrate them with each other by swaging, so it is possible to increase productivity for integrating the reinforcement cylindrical members with the cylindrical member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
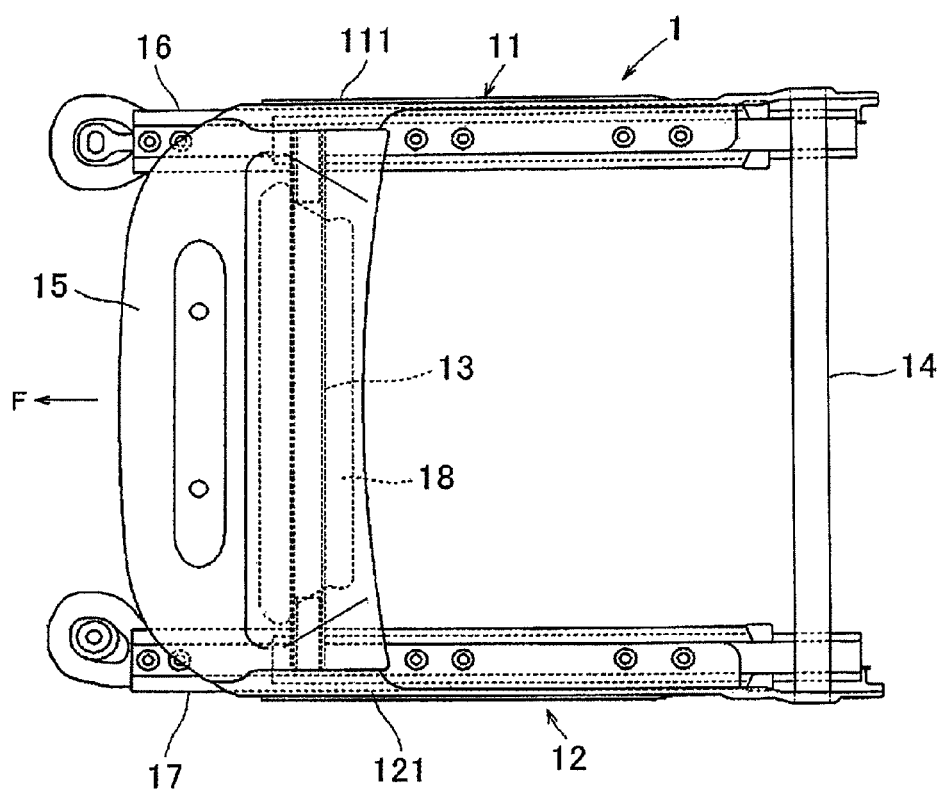
FIG. 1 is a plan view of an embodiment of the invention.
Figure 2:
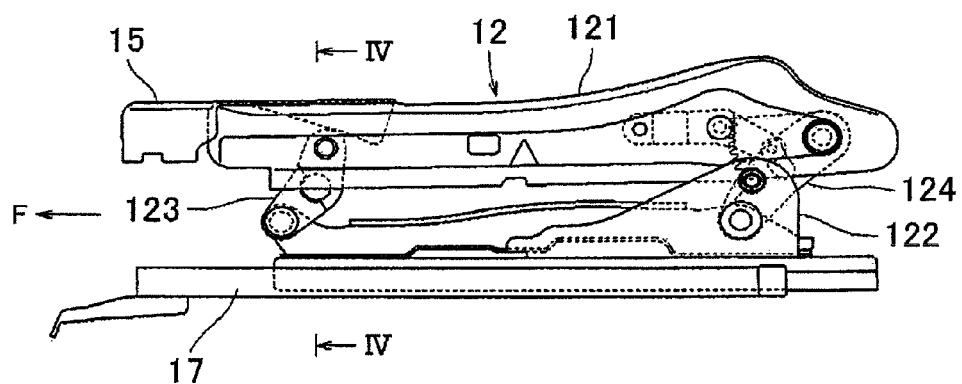
FIG. 2 is a side view of the embodiment.
Figure 3:
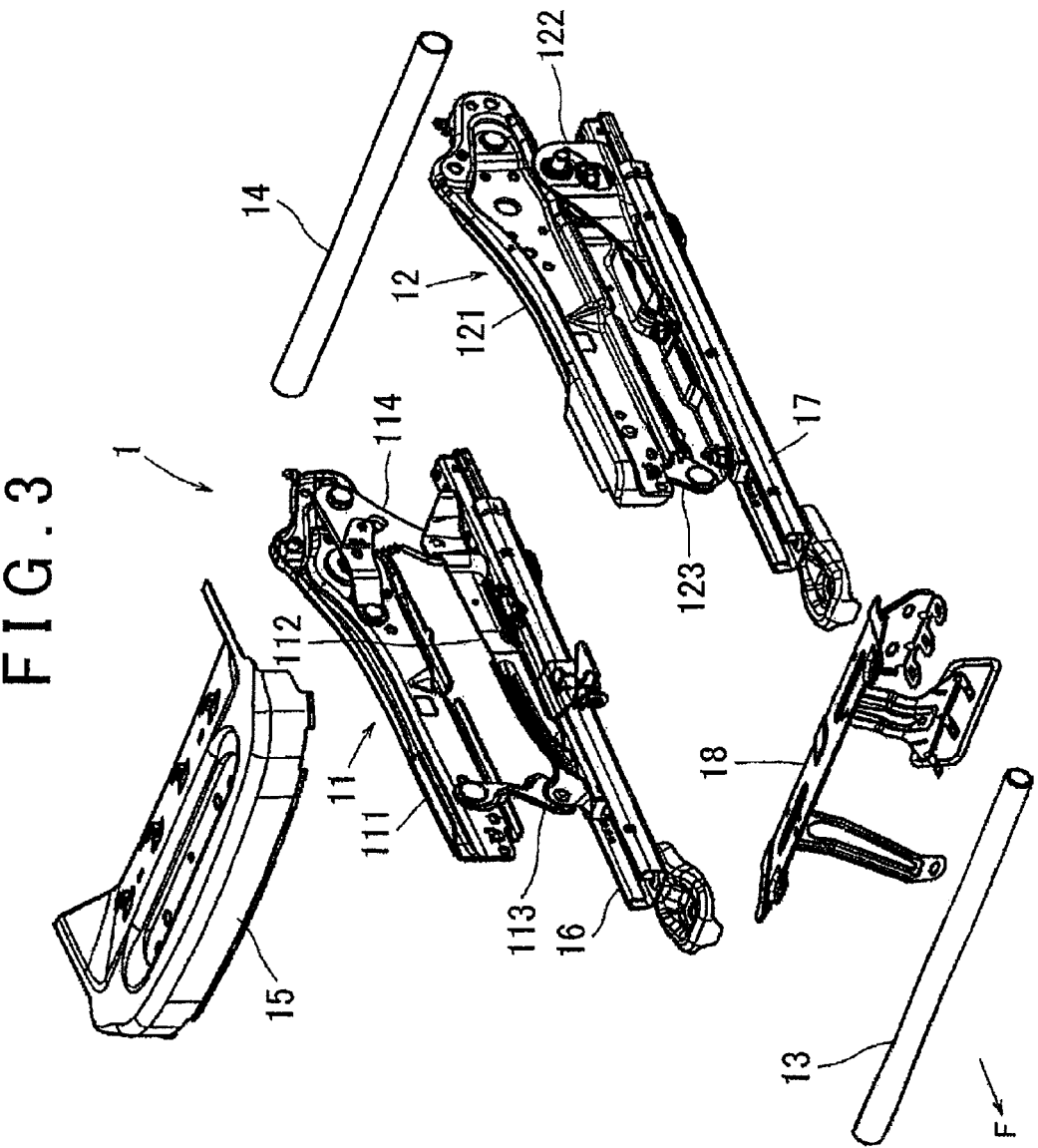
FIG. 3 is an exploded perspective view of the embodiment.
Figure 4:
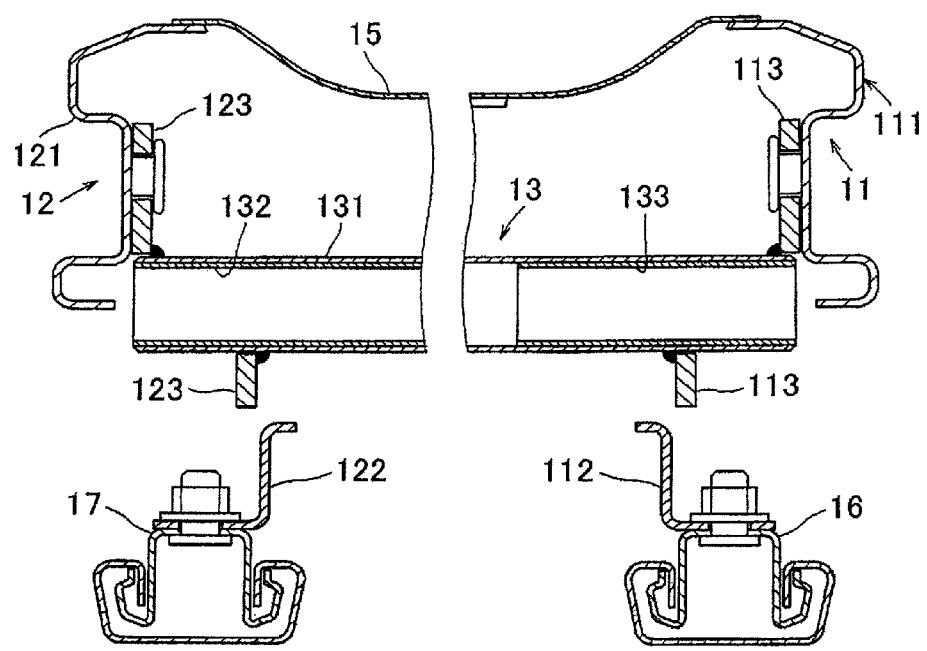
FIG. 4 is a cross-sectional view taken along the line IV-IV in FIG. 2.

As shown in FIG. 1 to FIG. 4, a framework of a vehicle seat cushion 1 is formed as follows. Longitudinal frame members 11 and 12 are arranged at right and left sides with respect to a vehicle travel direction F. The front and rear sides of the longitudinal frame members 11 and 12 are respectively connected by lateral frame members 13 and 14. A panel 15 is fixed to the front end portions of both longitudinal frame members 11 and 12 so as to cover a space between both longitudinal frame members 11 and 12, including the front-side lateral frame member 13, from above. Both longitudinal frame members 11 and 12 include a known vertical adjustment mechanism. The longitudinal frame member 11 is formed of an upper longitudinal frame member 111, a lower longitudinal frame member 112, a front link 113 and a rear link 114. The longitudinal frame member 12 is formed of an upper longitudinal frame member 121, a lower longitudinal frame member 122, a front link 123 and a rear link 124. As is known, the rear link 114 is configured to be able to selectively adjust an angle that is made between the upper longitudinal frame member 111 and the lower longitudinal frame member 112. Through angle adjustment of the rear link 114, the height between the upper longitudinal frame members 111 and 121 and the lower longitudinal frame members 112 and 122 is adjusted.

Figure 5:
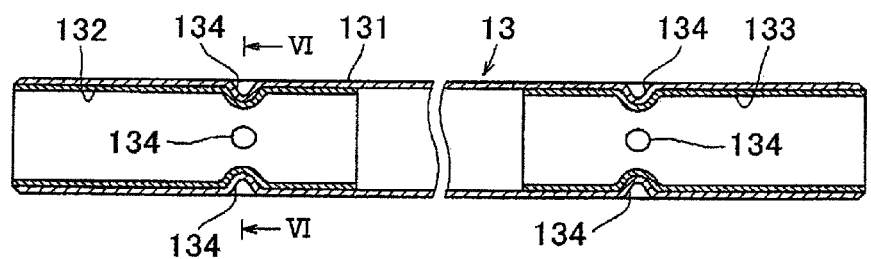
FIG. 5 is a horizontal cross-sectional view of a front-side lateral frame member according to the embodiment.
Figure 6:
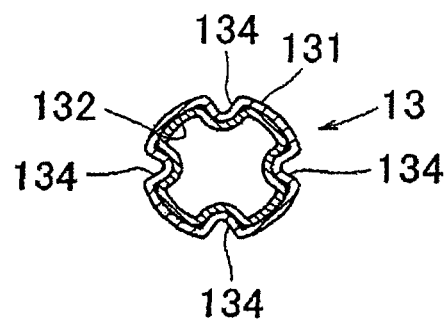
FIG. 6 is a cross-sectional view taken along the line VI-VI in FIG. 5.

The front-side lateral frame member 13 is connected between the coupling end portions of the front links 113 and 123 that respectively couple the upper longitudinal frame members 111 and 121 to the lower longitudinal frame members 112 and 122. The rear-side lateral frame member 14 is connected between the rear ends of the upper longitudinal frame members 111 and 121. The front-side lateral frame member 13 is thinner at a portion between connecting portions, at which the front-side lateral frame member 13 is connected to the front links 113 and 123, than the connecting portions. Specifically, the front-side lateral frame member 13 is formed of a cylindrical member 131. Both openings of the cylindrical member 131 extend through the front links 113 and 123, and are connected to the front links 113 and 123 by welding. Reinforcement cylindrical members 132 and 133 (which function as additional members according to the invention) are fitted to the front-side lateral frame member 13 along the inner peripheral side of the cylindrical member 131 at the respective connecting portions, at which the cylindrical member 131 is connected to the front links 113 and 123. The cylindrical member 131 and the reinforcement cylindrical members 132 and 133 are integrated with each other by swaging in mutually overlapped directions. FIG. 5 and FIG. 6 show swaged portions 134 formed by swaging. Note that the reinforcement cylindrical members 132 and 133 may be fitted along the outer peripheral side of the cylindrical member 131. When the reinforcement cylindrical members 132 and 133 are arranged on the outer peripheral side of the cylindrical member 131 in this way, the outside diameter of the center portion of the lateral frame member 13 is small by an amount by which the reinforcement cylindrical members 132 and 133 are not present, so a distance between the panel 15 and the lateral frame member 13 slightly increases, and it is advantageously possible to increase a deformable amount of the panel 15. That is, it is possible to increase the amount of absorption of energy against an impact load that is generated as a result of a submarine phenomenon. FIG. 5 and FIG. 6 show a state where the cylindrical member 131 and the reinforcement cylindrical members 132 and 133 are swaged. As is apparent from the drawings, the four swaged portions 134 are formed in the circumferential direction for each of the reinforcement cylindrical members 132 and 133. Among the four portions, swaging is performed two by two. Swaging of two portions in the first swaging work is performed at positions that face each other via the center of the cylindrical member 131. Therefore, by performing swaging work twice while the cylindrical member 131 is sandwiched with the use of swaging tools that face each other, it is possible to form the four swaged portions 134.

According to the above-described embodiment, because the thickness of the front-side lateral frame member 13 is thin, the strength of the front-side lateral frame member 13 against pressing via the panel 15 from above is small. Therefore, when the panel 15 is deformed as a result of a submarine phenomenon in the event of a collision of the vehicle, the front-side lateral frame member 13 is also deformed, and it is possible to effectively absorb energy that is generated through the collision. In addition, the thickness of each of the connecting portions, at which the front-side lateral frame member 13 is connected to the longitudinal frame members 11 and 12, is not thin, so it is possible not to decrease the strength of connection between the longitudinal frame members 11 and 12 and the lateral frame member 13. The lateral frame member 13 is connected to the front links 113 and 123 of the longitudinal frame members 11 and 12 by welding, so the large heat capacity of each of the welded portions of the lateral frame member 13 is ensured together with the large thickness of the lateral frame member 13, so excessive melting of the welded portions is prevented through adequate dispersion of welding heat, and it is possible to prevent a decrease in welding strength. In addition, in order to change the thickness between the connecting portions, at which the lateral frame member 13 is connected to the longitudinal frame members 11 and 12, and the portion between the connecting portions, it is just required to add the reinforcement cylindrical members 132 and 133 that serve as the additional members, so it is possible to increase productivity for changing the thickness. Furthermore, it is possible to change the thickness by overlapping the reinforcement cylindrical members 132 and 133 with the cylindrical member 131 that forms the lateral frame member 13 and then integrate them with each other by swaging, so it is possible to increase productivity for integrating the reinforcement cylindrical members 132 and 133 with the cylindrical member 131.

Note that a reinforcement panel 18 is fixedly welded to the lower face of the rear center portion of the panel 15 as indicated by the broken line in FIG. 1. In this way, the strength of the panel 15 is adjusted by adding the reinforcement panel 18 to the panel 15. By so doing, the amount of absorption of energy through deformation of the panel 15 in the event of a collision of the vehicle is appropriately set. In addition, longitudinal slide mechanisms 16 and 17 allow the seat cushion to slide longitudinally.

The invention is not limited to the appearance and configuration described in the above embodiment. Various modifications, additions and omissions are possible as long as the scope of the invention is not changed. For example, the lateral frame member is not limited to the one having a cylindrical shape; it may be the one having a square tubular shape or a plate shape. A seat cushion frame that does not include a vertical adjustment mechanism may be employed.

What is claimed is:

1. A vehicle seat cushion frame comprising:
   longitudinal frame members that are arranged at both right and left sides of a framework of a seat cushion;

front-side and rear-side lateral frame members that respectively connect front and rear sides of the longitudinal frame members; and a panel that is fixed to both longitudinal frame members so as to cover a space between front end portions of both longitudinal frame members, including the front-side lateral frame member, from above, wherein the front-side lateral frame member has connecting portions, at which the front-side lateral frame member is connected to the longitudinal frame members; and a portion of the front-side lateral frame member, which is between the connecting portions, is thinner than the connecting portions, the front-side lateral frame member is a cylindrical member, reinforcement cylindrical members are fitted to one of an inner peripheral side and an outer peripheral side of the cylindrical member at the respective connecting portions, at which the cylindrical member is connected to the longitudinal frame members, the cylindrical member and the reinforcement cylindrical members are integrated with each other by mutually overlapped swaged portions, and the overlapped swaged portions project inwardly toward the inner peripheral side of the cylindrical member so as to define concave depression portions on the outer peripheral side of the cylindrical member.

2. The vehicle seat cushion frame according to claim 1, wherein the cylindrical member includes opening sides and both opening sides of the cylindrical member are respectively connected to the longitudinal frame members so as to extend through the longitudinal frame members.

3. The vehicle seat cushion frame according to claim 1, wherein the reinforcement cylindrical members are fitted to the inner peripheral side of the cylindrical member at the respective connecting portions, at which the cylindrical member is connected to the longitudinal frame members.

4. The vehicle seat cushion frame according to claim 1, wherein the reinforcement cylindrical members are fitted to the outer peripheral side of the cylindrical member at the respective connecting portions, at which the cylindrical member is connected to the longitudinal frame members.

* * * * *